US012674663B2

(12) United States Patent
Śniegucki

(10) Patent No.: US 12,674,663 B2
(45) Date of Patent: Jul. 7, 2026

(54) METHOD FOR DETERMINING A CONTOUR OF AN OBJECT

(71) Applicant: Aptiv Technologies AG, Schaffhausen (CH)

(72) Inventor: Mateusz Śniegucki, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 254 days.

(21) Appl. No.: 18/581,075

(22) Filed: Feb. 19, 2024

(65) Prior Publication Data

US 2024/0191987 A1 Jun. 13, 2024

(30) Foreign Application Priority Data

Jan. 11, 2024 (EP) ..................................... 24151404

(51) Int. Cl.
G01B 15/04 (2006.01)

(52) U.S. Cl.
CPC .................................... G01B 15/04 (2013.01)

(58) Field of Classification Search
None
See application file for complete search history.

(56) References Cited

U.S. PATENT DOCUMENTS

| | | | |
|---|---|---|---|
| 2020/0191943 A1* | 6/2020 | Wu ........................ | G01S 13/726 |
| 2021/0209785 A1 | 7/2021 | Unnikrishnan et al. | |
| 2022/0161815 A1* | 5/2022 | Van Beek ............. | B60W 50/16 |
| 2022/0187841 A1* | 6/2022 | Ebrahimi Afrouzi ........................ | |
| | | | G05D 1/0272 |

FOREIGN PATENT DOCUMENTS

| | | |
|---|---|---|
| JP | 2019002790 A | 1/2019 |
| JP | 2019128243 A | 8/2019 |

OTHER PUBLICATIONS

Extended European Search Report regarding European Patent Application No. 24151404.1, dated Jul. 12, 2024.

* cited by examiner

*Primary Examiner* — Resha Desai
*Assistant Examiner* — Brandon James Henson
(74) *Attorney, Agent, or Firm* — Harness, Dickey & Pierce, P.L.C.

(57) ABSTRACT

A method is provided for determining a contour of an object with respect to a sensor being configured to provide sensor detections, each sensor detection including a respective position at the object. An initial contour including a plurality of segments is determined, each segment being related to a respective initial subset of the sensor detections. A respective surrounding set of the sensor detections is associated with each segment of the initial contour. A respective weight is provided to each of the sensor detections, each weight depending from a relative position of the sensor detection with respect to the associated segment. Each segment of the initial contour is refined by using the weights of the sensor detections of the respective surrounding set associated with the respective segment in order to determine a final contour including the refined segments for the object.

17 Claims, 8 Drawing Sheets

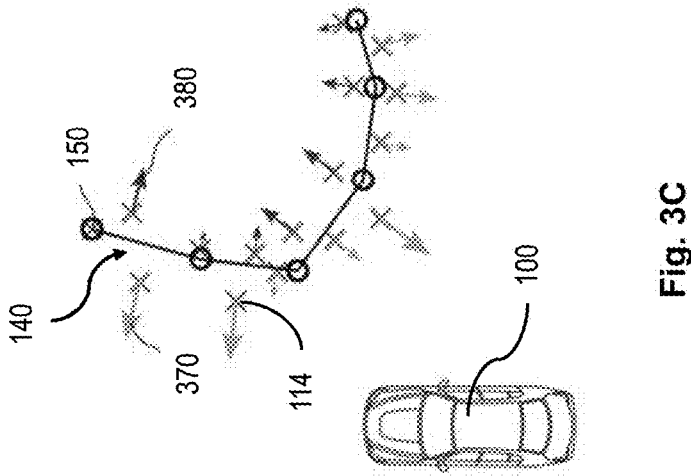
Fig. 3
Fig. 3C
Fig. 3B
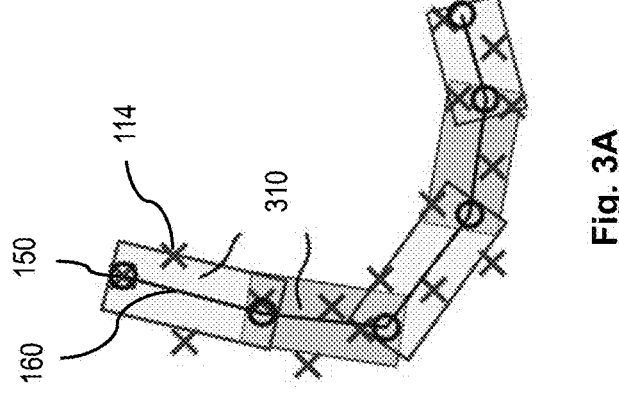
Fig. 3A

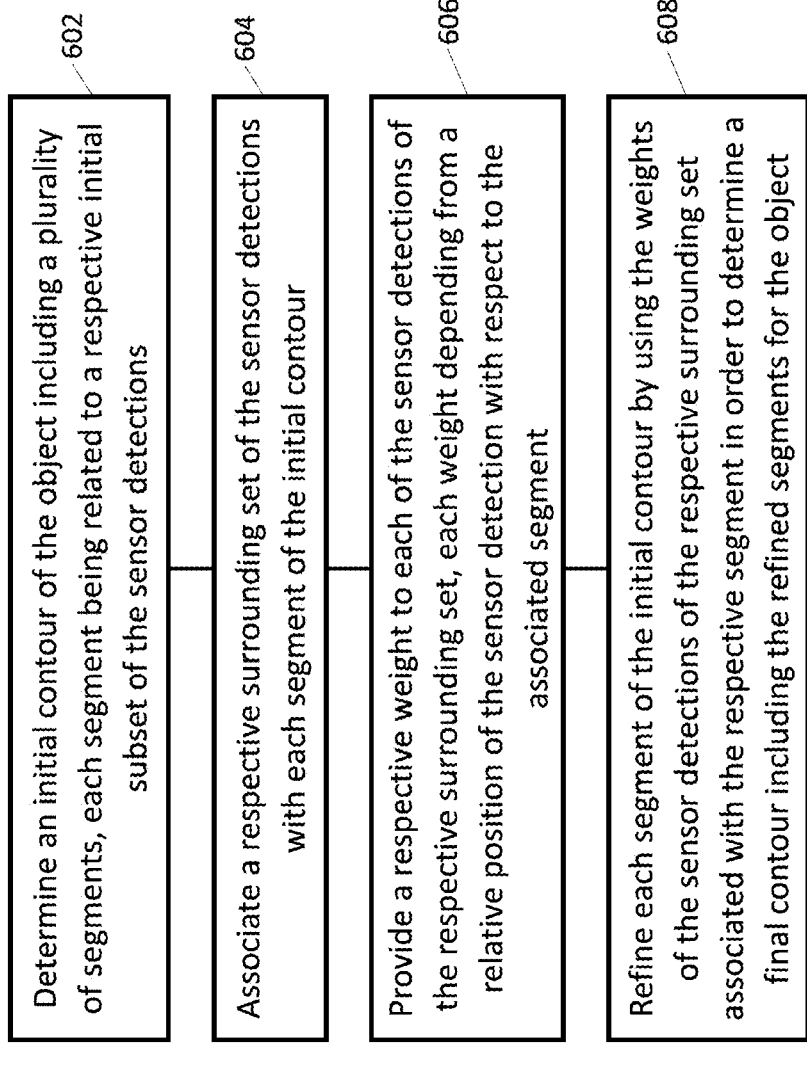

Determine an initial contour of the object including a plurality of segments, each segment being related to a respective initial subset of the sensor detections — 602

Associate a respective surrounding set of the sensor detections with each segment of the initial contour — 604

Provide a respective weight to each of the sensor detections of the respective surrounding set, each weight depending from a relative position of the sensor detection with respect to the associated segment — 606

Refine each segment of the initial contour by using the weights of the sensor detections of the respective surrounding set associated with the respective segment in order to determine a final contour including the refined segments for the object — 608

METHOD FOR DETERMINING A CONTOUR OF AN OBJECT

CROSS-REFERENCE TO RELATED APPLICATIONS

This application claims the benefit and priority of European patent application number 24151404.1, filed on Jan. 11, 2024. The entire disclosure of the above application is incorporated herein by reference.

FIELD

This section provides background information related to the present disclosure which is not necessarily prior art.

The present disclosure relates to a method for determining a contour of an object with respect to a sensor.

BACKGROUND

Different methods are known for localizing a contour or boundary of an object based on a point cloud provided by a range sensor like a radar sensor or a Lidar sensor. Such methods usually rely on a two-dimensional point cluster or point cloud given in a bird's eye view representation. The known methods include methods relying on convex hull, concave hull, recasting alpha shapes, or Delaunay triangulation, for example.

The known methods for determining a contour or boundary of an object based on a point cloud or point cluster provided by a range sensor are usually computationally expensive, and they usually do not consider the statistical distribution or spread of the point cloud. Such a spread may be caused by noise and/or clutter of the range sensor, e.g. of a radar sensor or a Lidar sensor.

Therefore, the boundary and in particular edges of a real object are often represented by a fuzzy contour since the known method normally localize such a contour in a conservative manner by more or less connecting such elements or detections of the point cloud which have the closest distance with respect to the sensor. Hence, outlier points may be overestimated. In summary, the contours of objects determined by the known methods do not represent the boundary of a real object accurately in many cases.

Accordingly, there is a need to have a method which is able to localize a boundary of an object accurately based on detections of a range sensor.

SUMMARY

This section provides a general summary of the disclosure, and is not a comprehensive disclosure of its full scope or all of its features.

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining a contour of an object with respect to a sensor, wherein the sensor is configured to provide a plurality of sensor detections, each sensor detection including a respective position at the object. According to the method, an initial contour of the object including a plurality of segments is determined, wherein each segment is related to a respective initial subset of the sensor detections. A respective surrounding set of the sensor detections is associated with each segment of the initial contour. A respective weight is provided to each of the sensor detections of the respective surrounding set, wherein each weight depends on a relative position of the sensor detection with respect to the associated segment. Each segment of the initial contour is refined by using the weights of the sensor detections of the respective surrounding set associated with the respective segment in order to determine a final contour including the refined segments for the object.

The sensor may be a range sensor like a radar sensor or a Lidar sensor which is able to determine a range or distance of a point or detection at an object with respect to a reference position at the sensor. In addition, such a sensor may be able to estimate an angle, e.g. with respect to a reference line passing through a sensor along e.g. a longitudinal axis of a vehicle on which the sensor in mounted. Therefore, the sensor may be able to determine the spatial positions of respective points or detections at an object in two or three dimensions. For example, if a radar sensor is used, the sensor detections may be represented in a two-dimensional coordinate system in a bird's eye view, i.e. when looking from above at the sensor and the object under consideration.

Therefore, determining the contour, i.e. the initial contour and the final contour, of the object with respect to the sensor means that the contour or boundary of the object may be represented in such a two-dimensional coordinate system in bird's eye view. The center of such a coordinate system may be located at the sensor.

Determining the respective range of the sensor detections and their angles with respect to a reference position at the sensor and a reference direction, respectively, may be performed by a processing unit which may be installed e.g. in a vehicle at which the sensor is mounted. In addition, such a processing unit may be configured to perform the steps of the method as described above. Hence, the sensor detection may be acquired with respect to an external environment of such a vehicle, and each sensor detection may be associated with an object located in the external environment of the vehicle.

According to the method, initial subsets of sensor detections are selected and considered for determining the initial contour instead of more or less connecting the closest points or detections when viewed from the sensor, which is mostly the basis for the known methods. Due to the selection of the subsets for determining the initial contour, a certain spread or distribution of the detections is automatically incorporated into the method. This may allow for determining a contour which is closer to the real contour of the object in comparison to the results of the known methods.

Moreover, since the initial subsets of the sensor detection and, for the refinement of the segments, respective surrounding sets of the sensor detections are selected e.g. by predefined criteria, outliers of the sensor detections may be recognized and excluded from the procedure for estimating the contour of the object. Therefore, the accuracy of the final contour may be improved by avoiding the influence of obvious outliers.

The initial contour may have an improved smoothness in comparison to the results of known methods since a certain distribution of the sensor detections is represented by the respective initial subset on which the determination of the respective segment of the initial contour is based. However, if the sensor detections have a great lateral spread, e.g. with respect to the initial contour, this initial contour may not represent the real contour or boundary of the object properly. For example, if there is a great spread of the sensor detections in longitudinal and lateral direction when viewed from the sensor, the initial contour may nevertheless extend e.g. through the middle of such a cloud or cluster of points or sensor detections.

In comparison to the real contour of the object, such an initial contour may have a greater distance with respect to the sensor if all sensor detections belonging to the respective subset are considered in the same or equal manner. In other words, the sensor detections belonging to a respective initial subset may all have the same weight for determining the respective segment of the initial contour.

Therefore, a refinement of the initial contour may be required in some cases in which a great spread of the sensor detection or even some skewness or tilt of a point cloud of the sensor detections is present which may cause that the initial contour may deviate from the object's real contour. Therefore, a respective surrounding set of the sensor detections is associated with each segment of the initial contour, wherein associating the respective surrounding set of sensor detections may be performed by different criteria as described below.

Within the respective surrounding set of sensor detections, each sensor detection may be provided with a respective weight which depends on the relative position or distance of the sensor detection with respect to the associated segment which belongs to the initial contour. For example, sensor detections of the respective surrounding set which have a greater distance with respect to the initial contour and/or which may be located closer to the sensor than the initial contour may be provided with a higher weight than sensor detections which are closer to the initial contour and/or which may have a greater distance with respect to the sensor than the initial contour.

Each segment of the initial contour may be refined based on the weights of the detections within the respective surrounding set associated with the respective segment, e.g. by shifting the segment based on the weights or by performing a certain regression procedure based on the sensor detections belonging to the respective surrounding set and having different weights due to their different relative positions with respect to the associated segment. Due to the refinement of each segment of the initial contour based on the weights of the detections, the spread or distribution of the sensor detections with respect to the position of the sensor may be incorporated in a more realistic manner than by the method steps of determining the initial contour and its segments. Therefore, the final contour including the refinement may represent the real contour of the object more accurately than the initial contour.

According to an embodiment, the initial contour may further include a plurality of vertices, and the segments of the initial contour may extend between a respective pair of the vertices. One of the sensor detections may be selected as a first vertex, and the further vertices following the first vertex may be iteratively determined by selecting the respective initial subset of the sensor detections with respect to the respective preceding vertex, and by estimating a position of the next vertex by utilizing the respective initial subset being selected with respect to the preceding vertex.

In other words, a first vertex may be selected from the sensor detections, e.g. on one of the outer sides in a lateral direction of a point cloud representing the sensor detections when viewed from the sensor, and a second vertex may be determined based on the initial subset selected for the first vertex, e.g. within a close environment of the first vertex by using the subset of sensor detections for determining a direction and a dimension of the first segment extending from the first vertex to the second vertex. Thereafter, the initial subset associated with the second vertex may be determined by selecting sensor detections having a position close to the second vertex, and the initial subset associated with the second vertex may be used for determining the third vertex, and so on. By this means, a polyline including the segments of the initial contour may be drawn iteratively through the point cloud representing the sensor detections.

By selecting the respective initial subset with respect to the respective preceding vertex, some spread of the detections may be considered when determining the next vertex. However, outliers may be excluded which may be located e.g. quite far away from the respective vertex and which may disturb the proper determination of the polyline representing the segments of the initial contour. This may improve the accuracy of the initial contour, i.e. of the polyline which includes the segments which are connected to each other at the respective vertices.

Selecting the respective initial subset of the sensor detections for the preceding vertex may include selecting sensor detections being located within a predefined area around the preceding vertex. For example, the respective preceding vertex may be the center of the predefined area. Hence, the predefined area may be shifted iteratively from one vertex to the next vertex for selecting the respective initial subset of the sensor detections in order to determine a further vertex again. Such method steps of selecting sensor detections iteratively and determining the respective next vertex may require a low computational effort.

The predefined area may therefore be provided as a rectangular bounding box or even a square bounding box which may be centered at the respective vertex and which may be shifted from a respective one of the vertices to the subsequent vertex when the plurality of vertices is determined iteratively. The rectangular or square bounding box which may be represented in bird's eye view with respect to the sensor and the object, e.g. when a radar sensor is used which provides the sensor detections in two dimensions, i.e. in a plane extending in parallel to the ground.

Furthermore, the sensor detections selected for the initial subset of the preceding vertex may be excluded from the initial subset for the subsequent vertex. Hence, sensor detections which have already been used for localizing or determining a vertex of the initial contour may not be used a second time for determining a further vertex. Due to this, the accuracy of the initial contour may be improved since the initial contour may follow the course of the sensor detections more properly if sensor detections are not used twice.

Moreover, the sensor detection selected as the first vertex may be identified by: determining at least two sorted lists for the positions of the sensor detections, each sorted list referring to respective coordinate of the positions, selecting the sorted list having the greatest difference between the first element and the last element of the list, and selecting the first element of the selected sorted list as the first vertex.

The positions of the sensor detections may include coordinates which may be represented with respect to a coordinate system having a center at a reference position at or close to the sensor, and the respective coordinates of the positions of the sensor detections may include an x-coordinate and an y-coordinate with respect to such a coordinate system if the coordinate system is defined in two dimensions, e.g. in a bird's eye view. The greatest spread of the sensor detections along one of the axes of the coordinate system may determine the direction or alignment of a point cluster or cloud representing the sensor detections. Due to these steps of sorting and selecting, a suitable sensor detection close to an outer edge of such a point cloud representing the sensor detections may be selected as the first vertex or starting point for the polyline representing the initial contour.

Estimating the position of the next vertex by utilizing the respective initial subset may include determining a segment vector extending from the preceding vertex to the next vertex by: calculating a geometric mean over the sensor detections of the respective initial subset, wherein the geometric mean may provide a direction of the segment vector, and determining a most distant sensor detection with respect to the preceding vertex within the respective initial subset, wherein a distance between the most distance sensor detection and the preceding vertex may define the absolute value of the segment vector.

Since the segment vector may connect a pair of vertices, i.e. the preceding vertex and the next vertex, the steps of calculating the geometric mean and of determining the most distant sensor detection may be used for providing the next vertex iteratively. Moreover, the geometric mean may reflect the distribution or spread of the sensor detections within the respective initial subset.

According to a further embodiment, a respective primary area may be arranged symmetrically to the respective segment, and the respective surrounding set of sensor detections may include regular sensor detections which are located within the primary area. Furthermore, a respective modified area may be determined by modifying the respective primary area according to a distribution of the sensor detection with respect to the sensor, and the respective surrounding set of sensor detections may further include special sensor detections which are located within the modified area and outside the primary area. The regular sensor detections may be provided with a normal weight, whereas the special sensor detections may be provided within an increased weight being larger than the normal weight.

The sensor detections of the respective surrounding subset being associated with the respective segment of the initial contour may therefore include two different groups of sensor detections, i.e. the regular sensor detections which are provided with the normal weight, and the special sensor detections being provided with the increased weight with respect to the normal weight. Sensor detections being located outside of both areas, i.e. outside of all primary and modified areas, may therefore have no association to any of the segments of the initial contour such that these detections may be identified as outliers.

The respective primary area may have a predefined shape, for example the shape of a rectangular bounding box extending from one vertex to the next vertex along the respective segment and having a predefined width being smaller than the length of the respective segment. The predefined width of such a rectangular bounding box may be based on properties of the sensor, e.g. depending from a sensor resolution.

The distribution of the sensor detections with respect to the sensor on which the modification of the primary area depends may reflect the spread of the sensor detections also with respect to the initial contour. For example, if the distribution of the sensor detections has a great spread with respect to one or two directions when viewed from the sensor, it may be expected that the initial contour may not reflect the real contour of the object under consideration realistically. Hence, the primary area may be modified, e.g. shifted in a direction perpendicular to the respective segment, in order to provide an asymmetric area with respect to the respective segment in order to associate further sensor detections, i.e. the special detections, which may be located close to the real boundary of the object under consideration.

Therefore, the special sensor detections having an increased weight may "attract" the respective segment of the initial contour in the step of refinement. Hence, the refined segments providing the final contour may follow the real boundary or contour of the object more accurately than the initial contour due to the influence of the special sensor detections.

The respective modified area may be determined by shifting the respective primary area in a direction perpendicular to the respective segment, and the direction as well as the amount of the shifting may depend on the distribution of the sensor detections with respect to the sensor. For example, respective bounding boxes representing the respective primary area may be shifted in a direction to or from the sensor according to the spread of the sensor detections.

Moreover, a respective segment vector may be determined as a difference between position vectors of the pair of vertices being associated with the respective segment, a respective normal vector being perpendicular to the respective segment vector may be determined for each segment, and an auxiliary vector may be determined as a difference of two further position vectors, i.e. a position vector of a reference close to the sensor position and a position vector of a center of the segment being closest to the sensor. For all segments, an amount of the shift of the primary area may be given by a dot product of the auxiliary vector and the normal vector of the segment being closest to the sensor, and a direction of the shift may be given by the respective normal vector of the segment.

The amount of the shift of the primary area may be defined by a predefined value, and according to the dot product of the auxiliary vector and the normal vector of the closest segment, the shift may be applied to the primary area or not. For example, the shift of the primary area of the respective segments may be shifted in a direction to the sensor if the dot product is greater than zero. Otherwise, no shift may be applied.

Alternatively, the amount of the shift may not only relate to an absolute value of the shift, but also to the sign which may be positive or negative. For example, a positive dot product may indicate that the primary area is to be shifted by a certain amount provided by the dot product in a direction to the sensor, whereas a negative dot product may indicate the contrary, i.e. a shift of the primary area away from the sensor. The shift of the primary area may generally be performed perpendicularly to the respective segment, i.e. along the respective normal vector, by the same amount for all segments which might be either predetermined or depending from the value of the dot product.

Hence, an unambiguous procedure may be applied in order to determine the respective modified area belonging to each segment. Such a procedure may require a low computational effort.

In addition or as an alternative, it may be determined for each sensor detection of the respective surrounding set whether the sensor detection is located at the initial contour, on an inner side of the initial contour facing the sensor or on an outer side of the initial contour being averted from the sensor. The sensor detection located at the initial contour may be provided with a normal weight, whereas the sensor detections located on the inner side may be provided with an increased weight which is greater than the normal weight, and the sensor detections located on the outer side may be provided with a decreased weight which is smaller than the normal weight.

Therefore, increasing or decreasing the weights of the sensor detections with respect to the normal weight may depend on the respective position or distance of the detections with respect to the initial contour. By this means, the spread of the sensor detections with respect to the initial contour may be reflected in the respective weight of the sensor detections. That is, if almost all sensor detections may be located close to the initial contour such that there is almost no spread of the sensor detections with respect to the initial contour, all weights may be close to the normal weight which may be e.g. 1.0. Accordingly, there may be almost no refinement of the initial contour in this case. In contrast, if there is great spread of the sensor detections with respect to the initial contour, many sensor detections may be provided with an increased or decreased weight with respect to the normal weight of e.g. 1.0. Accordingly, there may be an intense refinement of the initial contour, e.g. in a direction to the sensor.

According to a further embodiment, refining each segment of the initial contour may include using a regression procedure for adapting a respective segment to the weighted sensor detections of the respective surrounding set of sensor detections associated with the respective segment. The weighted sensor detections may therefore be used as nodes for the regression procedure. Different types of regression procedures may be used, e.g. a Deming regression and/or a Kalman filter.

The regression procedure may be applied iteratively to the segments of the initial contour starting with the first segment. Accordingly, the position of the second vertex limiting the first segment may be refined first by applying the regression procedure to the weighted sensor detections of the first surrounding subset associated with the first segment. Thereafter, the position of the third vertex may be refined by applying the regression procedure to the weighted sensor detections of the surrounding subset associated with the second segment, and so on. Applying such standard regression procedures iteratively may still require a low computational effort.

In another aspect, the present disclosure is directed at a computer system, said computer system being configured to receive a plurality of sensor detections from a sensor being configured to determine a respective position of the sensor detections and to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

As used herein, terms like processing unit and module may refer to, be part of, or include an Application Specific Integrated Circuit (ASIC), an electronic circuit, a combinational logic circuit, a Field Programmable Gate Array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

In another aspect, the present disclosure is directed at a vehicle including a sensor being configured to acquire a plurality of sensor detections and to determine a respective position of the sensor detections, and the computer system as described above.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically:

FIG. 3 is an illustration of method steps for associating sensor detections with a respective segment of the initial contour.

FIG. 6 is an illustration of a flow diagram illustrating a method for determining a contour of an object with respect to a sensor according to various embodiments.

Corresponding reference numerals indicate corresponding parts throughout the several views of the drawings.

DETAILED DESCRIPTION

Example embodiments will now be described more fully with reference to the accompanying drawings.

Figures 1, 1A, 1B, 1C:
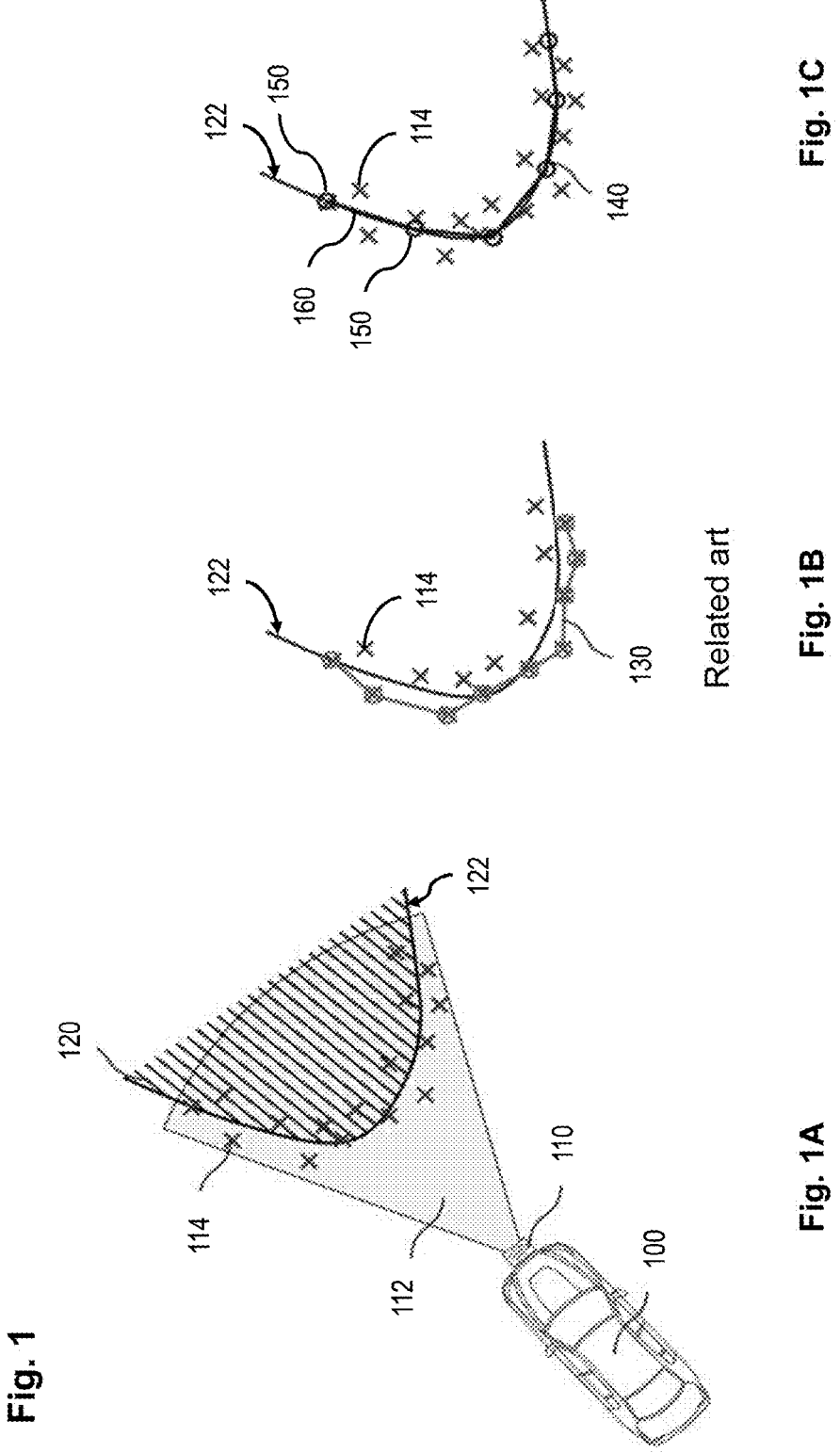
FIG. 1 is an illustration of a real contour of an object being detected by a radar sensor, and approximate contours of the object estimated based on sensor detections by applying known methods and method steps according to the disclosure.

FIG. 1A schematically depicts a vehicle 100 at which a radar sensor 110 is installed. The radar sensor 110 has an instrumental field of view 112 and is configured to provide sensor detections 114 which are related to an object 120 located in the external environment of the vehicle 100 and of the radar sensor 110.

The sensor detections 114 each include a respective spatial location, i.e. a range with respect to a reference position at the sensor 110, and an angle, i.e. an azimuth angle, with respect to a reference direction provided by a longitudinal axis of the vehicle 100. In more detail, radar waves transmitted by the radar sensor 110 are reflected at a plurality of positions close to a real contour or boundary 122 of the object 120, and the radar waves reflected at these positions are received by the radar sensor 110 such that a processing unit (not shown) of the vehicle 100 is able to determine the spatial position, i.e. the range and the azimuth angle of the respective radar detections 114. The radar detections 114, i.e. their respective spatial positions, are provided in a so-called bird's eye view with respect to the vehicle 100 and the radar sensor 110, i.e. in a plane extending in parallel to the ground on which the vehicle 100 is currently located.

In order to e.g. avoid collisions of the vehicle 100 and the object 120, the outer boundary or contour 122 needs to be approximated based on the radar detections 114. FIG. 1B shows the results of a known method according to the related art. The real contour 122 of the object 120 is approximated by lines connecting the outermost sensor detections 114 when viewed from the sensor 110 or the vehicle 100. As can be recognized in FIG. 1B, the approximate contour 130 according to the related art is represented as a fuzzy boundary line which shows deviations from the real contour 122 in many regions. Such a conservative approximation 130 for the real contour 122 of the object 120 may be determined in order to avoid any encounter of the vehicle 100 with e.g. edges or protrusions of the object 120.

However, a more accurate representation or approximation of the real contour 122 may be required for many automotive applications. FIG. 1C shows the result of method steps according to the disclosure which provide another approximation of the real contour 122 by using the sensor detections 114 in a different manner. The approximation according to the disclosure is represented by a polyline 140 which extends between vertices 150 being determined iteratively based on the sensor detections 114 as will be described below in detail. The polyline 140 includes a plurality of segments 160, each of which extends between a pair of the vertices 150. As can be recognized when comparing FIG. 1C to FIG. 1B, the polyline 140 provided by the method according to the disclosure approximates the real contour 122 in a more accurate manner than the approximate contour 130 according to the related art.

Figures 2, 2A:
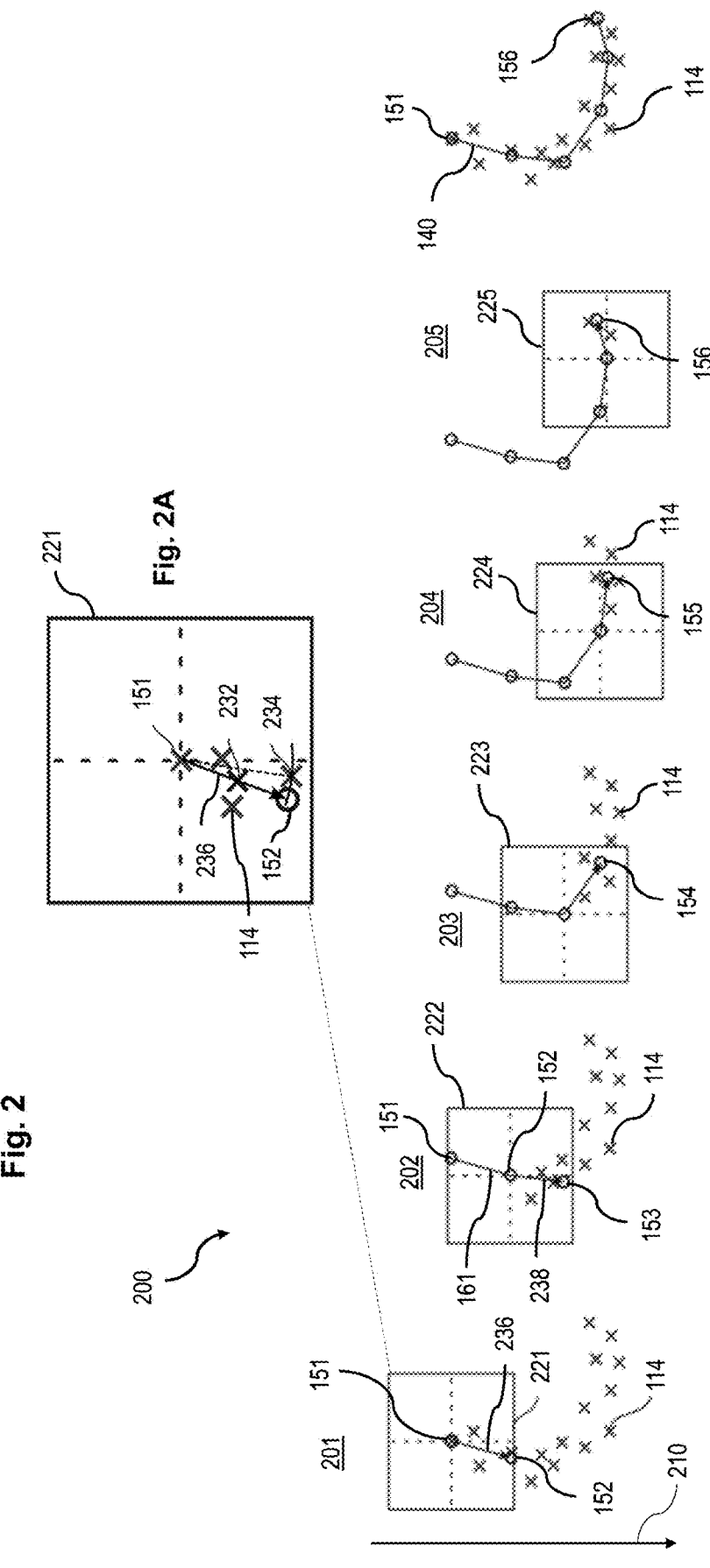
FIG. 2 is an illustration of method steps for determining an initial contour of an object based on sensor detections.

FIG. 2 schematically depicts details for determining the polyline 140 (see FIG. 1) iteratively. First, an initial or first vertex 151 is determined by selecting a suitable one of the sensor detections 114. For determining or selecting the first vertex 151, a respective length or spread of a point cloud provided by the sensor detections 114 is determined. In order to do so, the sensor detections 114 are sorted with respect to both axes of a coordinate system which is defined, for example, in bird's eye view and which has its origin at the sensor position. That is, the x-coordinate and the y-coordinate of the sensor detections 114 are sorted in two respective lists, starting with the largest value and ending with the smallest value of the respective coordinate.

Thereafter, the spread of each of the two sorted lists is calculated as the difference of the first and the last element of the respective list. The list having the greater spread between the first and the last element is selected, and the corresponding axis of the coordinate system defines a sorting direction which is indicated by the arrow 210 in FIG. 2. The first sensor detection 114 of the selected sorted list, i.e. sorted with respect to the direction 210, defines the first vertex 151 for the polyline 140 which is to be determined.

The first vertex 151 is a starting point of an iterative procedure 200 for determining the polyline 140 (see FIG. 1). In a first iteration denoted by 201 (see FIG. 2), a square bounding box 221 is drawn around the first vertex 151. That is, the first vertex 151 represents the center of the square bounding box 221. The square bounding box 221 encloses a predefined area in which a first initial subset of the sensor detections 114 is selected. In other words, the first initial subset includes all sensor detections 114 which are framed by the bounding box 221.

A geometric mean is calculated over all sensor detections belonging to the first subset. This is shown in detail in the enlarged portion denoted at FIG. 2A of the first iteration 201. Calculating the geometric mean over the sensor detections 114 within the bounding box 221 provides a mean point 232. In addition, a most distant sensor detection 234 is determined which has the greatest distance with respect to the first vertex 151 over all sensor detections 114 belonging to the first subset, i.e. within the first bounding box 221.

The mean point 232 and the most distant sensor detection 234 are used for determining a segment sector 236 which extends from the first vertex 151 to the second vertex 152. The mean point 232 defines the direction of the segment vector 236 with respect to the first vertex 151, whereas the most distant sensor detection 234 determines the length or absolute value of the segment vector 206. The positions of the first and second vertices 151, 152 define a first segment 161 of the polyline 140. That is, the first segment 161 extends between the first vertex 151 and the second vertex 152.

After determining the second vertex 152, the first bounding box 221 is shifted to the second vertex 152 such that the second vertex 152 represents the center of a second square bounding box 222 having the same dimensions as the first square bounding box 221. Thereafter, all sensor detections 115 are removed from the second bounding box 222 which have already been used in the first iteration step 201 for determining the second vertex 152. Therefore, in second iteration step the remaining sensor detections 114 are used which are framed by the second bounding box 222 and which have not been considered in the first iteration 201.

In a second iteration 202, a third vertex 153 is determined in the same manner as the second vertex 152. That is, a second segment vector 238 is determined in the second iteration 202, wherein the direction of the second segment vector 238 is determined by the geometric mean over all sensor detections 114 being framed by the second bounding box 222 which therefore belong to a second subset of the sensor detections 114. The most distant sensor detection 114 with respect to the second vertex 152 is determined again for the second subset, i.e. for the sensor detections 114 within the second bounding box 222. The length of the second segment vector 238 is given by the distance between this most distant sensor detection 114 and the second vertex 152. The second segment vector 238 determines the position of the third vertex 153.

In the third, fourth and fifth iteration denoted by 203, 204 and 205, a fourth, fifth, and sixth vertex 154, 155 and 156 is determined, respectively, in the same manner as the second vertex 152 and the third vertex 153. That is, a respective bounding box 223, 224 and 225 is drawn around the respective preceding vertex 153, 154, 155. All sensor detections 114 which have been used in the preceding iteration are removed from the respective bounding box 223, 224, 225, and the geometric mean as well as the most distant sensor detection are determined for the respective sensor detections 114 being framed by the bounding box 223, 224 and 225, respectively, in order to determine a respective segment vector which extends to the next vertex 154, 155 and 156, respectively.

The iteration ends if the bounding box shifted to the next vertex is empty, i.e. if all or almost all sensor detections 114 are "consumed" for determining the respective next vertex. However, there might be sensor detections 114 which are not framed by any of the bounding boxes 121 to 225 in any iterations. Such sensor detections 114 are identified as outliers and not further considered for determining the contour of the object 120 (see FIG. 1).

The entire polyline 140 being determined by the iteration 201 to 205 is shown on the right side of FIG. 2 together with vertices 151 to 155 and the sensor detections 114 which have been used for determining the polyline 140.

Under certain circumstances, however, the polyline 140 being determined as described in context of FIG. 2 may not yet provide a suitable approximation for the real contour 122 (see FIG. 1) of the object 120. This especially holds true if the sensor detections 114 related to the object 120, i.e. the point cloud of sensor detections 114, have a great spread in two directions or dimensions, e.g. in a direction following the polyline 140, and in a direction perpendicular to the polyline 140.

Figure 5:
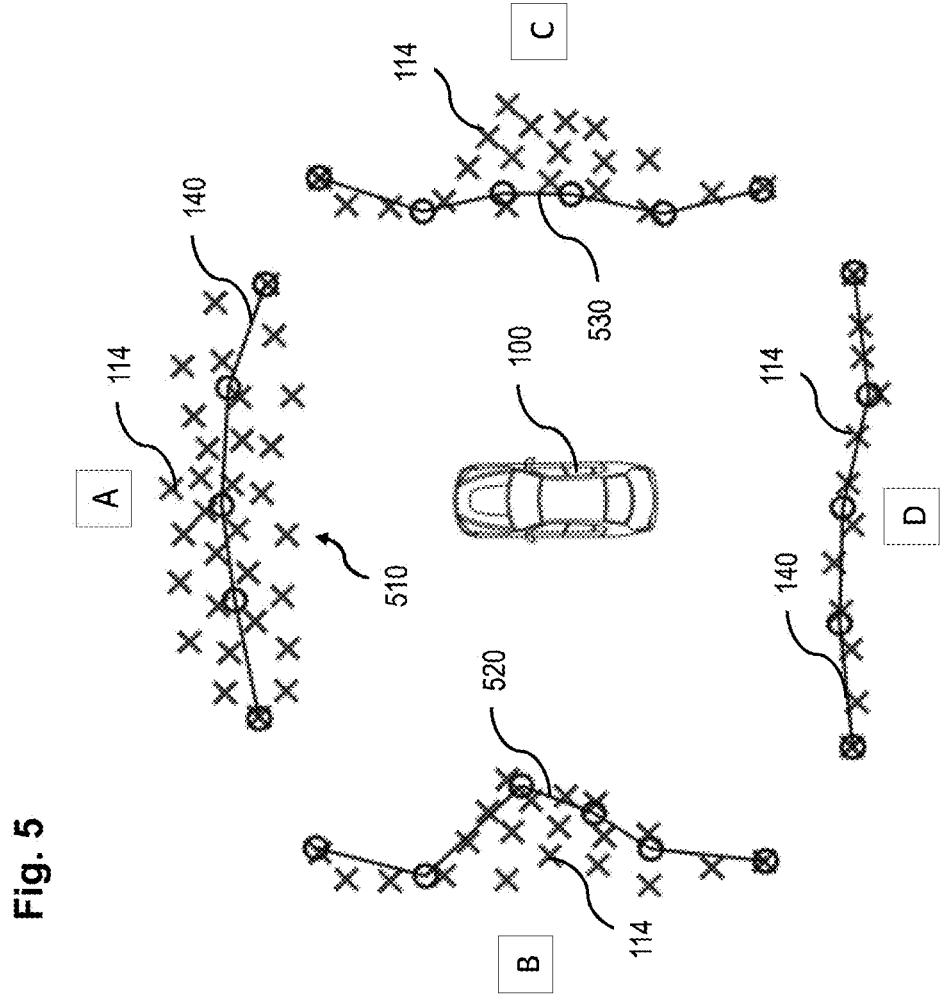
FIG. 5 is an illustration of examples for determining a contour of an object with and without the association-based refinement.

This is illustrated in FIG. 5 via the scenarios denoted by A and D. The different scenarios of FIG. 5 are depicted in relation to the vehicle 100 comprising the radar sensor 110 (see FIG. 1). The vehicle 100 is depicted in FIG. 5 in order to define a side facing the vehicle 100 for the respective point cloud of sensor detections 114.

In the scenario denoted by D in FIG. 5, the sensor detections 114 have a great spread in a first direction only, but a very small spread in a second direction extending perpendicularly to the first direction. Therefore, the polyline 140 determined by the iterative procedure 200 as shown in FIG. 2 and described above extends very close to the course of the sensor detections 114. Conversely, the deviation or distance of the respective sensor detections 114 with respect to the polyline 140 is very small. Hence, the polyline 140 as shown for the scenario denoted by D can be regarded as a good approximation of the real contour of the object for which the sensor detections 114 have been acquired.

In contrast, for the scenario as denoted by A in FIG. 5, the point cloud of sensor detections 114 has a great spread in two directions, i.e. in a longitudinal direction and a lateral direction when viewed from the vehicle 100. The polyline 140 as determined by the iterative procedure 200 of FIG. 2 extends through the middle of the point cloud of sensor detections 114 due to the mechanism as described above for determining the vertices 150 iteratively based on a geometric mean of a respective subset of sensor detections 114, i.e. within a respective bounding box.

Due to this, there are many sensor detections 114 on a side of the polyline 140 which faces the vehicle 100 and the sensor 110 (see FIG. 1). That is, there are many sensor detections 114 being closer to the vehicle 100 than the polyline 140. This portion of closer sensor detections 114 is denoted by 510 in FIG. 5 for the scenario A.

These close or near sensor detections 510 may represent parts of the object 120 (see FIG. 1) which in fact protrude from the assumed contour as provided by the polyline 140. Therefore, there might be parts of the object 120 represented by the near sensor detections 510 which may entail the danger for a collision with the vehicle 100. In other words, parts of the real contour of the object 120 (see FIG. 1) might be located closer to the vehicle 100 and to the sensor 110 as is suggested by the polyline 140 being determined by the iterative procedure as shown in FIG. 2. Hence, the vehicle 100 may be confronted with the risk of colliding with an object at least partly if the polyline 140 as shown for the scenario denoted by A in FIG. 5 is assumed as the real contour of an object. This is due to the fact that the great spread of the sensor detections 114 is not reflected properly when determining the polyline 140.

Therefore, the polyline 140 as shown in FIGS. 1 and 2 as well as for the scenarios A and D in FIG. 5 may be regarded as an initial or raw contour 140 of the object 120 (see FIG. 1) which needs to be refined in order to represent or approximate the real contour 122 of the object 120 properly.

Figures 4, 4A, 4B, 4C:
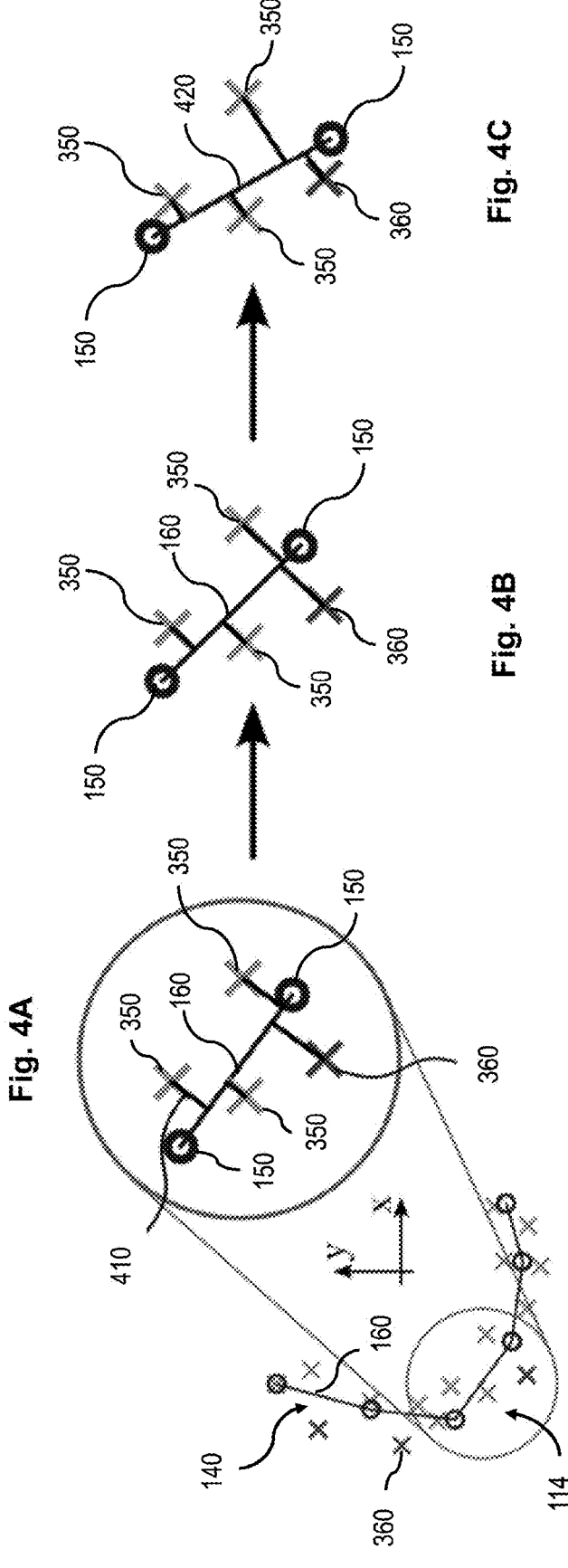
FIG. 4 is an illustration of method steps for refining a segment of the initial contour.

Method steps for the refinement of the initial contour 140 are illustrated in context of FIGS. 3 and 4. These steps include an association of a portion of the sensor detections 114 with a respective segment 160 of the initial contour 140, weighting the associated sensor detections 114, and refining the segments 160 of the initial contour 140 by applying a regression method to the weighted sensor detections which are associated with the respective segment 160.

FIG. 3A illustrates a first association step for a respective portion of the sensor detections 114 with the corresponding segment 160 of the initial contour 140 (see FIGS. 1 and 2).

For the first association step, a respective rectangular bounding box 310 is drawn around each segment 160 such that the bounding box extends symmetrically with respect to the segment 160 between a respective pair of vertices 150. Hence, the respective lengths of these bounding boxes 310 which may also be denoted as association bounding boxes correspond to the respective distance between a pair of vertices 150. The width perpendicular to the respective segment 160 is determined based on experience, e.g. in relation to a spatial resolution of the sensor 110.

Each sensor detection 114 which is located within one of the respective rectangular bounding boxes 310 is associated with the corresponding segment 160 to which this bounding box 310 belongs. The first association step based on the rectangular bounding boxes 310 which are arranged symmetrically with respect to the segments 160 may also be referred to as regular association.

Moreover, a second association step is applied to the sensor detections 114 for being able to consider a great spread of the sensor detections 114 in a direction perpendicular to the initial contour 140 in a proper manner. As shown in FIG. 3B, the second association step relies on asymmetric rectangular bounding boxes 320, i.e. asymmetric with respect to the respective segments 160 of the initial contour 140.

The rectangular bounding boxes 320 being arranged asymmetrically with respect to the segments 160 of the initial contour 140 are generated by shifting the rectangular bounding boxes 310 used for the regular association in a direction to the vehicle 100 on which the sensor 110 is mounted. A shifting direction 330 is determined for each of the association bounding boxes 310 by first computing a respective segment vector as a difference between the position vectors of subsequent or neighboring vertices 150. Second, a normal vector is constructed for each of the segments 160 by rotating the respective segment vector by 90°. The normal vector defines the direction for shifting the respective bounding boxes 310. The respective direction for shifting is indicated by the respective arrows 330.

Thereafter, an auxiliary vector 340 is determined which extends from the center of gravity 105 of the vehicle 100, i.e. a position close to the position of the sensor 110, to a midpoint of a segment 165 which has the closest distance with respect to the vehicle 100. Thereafter, a dot product is calculated between the auxiliary vector 340 and the normal vector of the closest segment 165 which extends in parallel to the direction as indicated by the arrow 330 belonging to the closest segment 165. If this dot product is greater than zero, the respective association bounding boxes 310 which arranged symmetrically with respect to the segment 160 (see FIG. 3A) are shifted in the direction to the vehicle 100 as indicated by the arrows 330.

Within the respective shifted bounding boxes 320, further sensor detections 114 which are denoted by 360 are located, and these sensor detections 360 are additionally associated with the respective segment 160 of the initial contour 140 in the second association step. The sensor detections 350 being already associated with one of the segments 160 in the regular association step (see FIG. 3A) are also depicted. The association performed based on the shifted bounding boxes 320, i.e. the second association step, may also be referred to as special association.

Furthermore, the sensor detections 350 associated to a respective segment 160 in the first or regular association step are provided with a normal weight of e.g. 1.0. In contrast, the sensor detections 360 associated to the respective segment 160 in the second or special association step are provided with an increased weight which is greater than 1.0, for example. Moreover, sensor detections 114 being not associated to any segment 150 in the first or second association step can be identified as outliers.

According to an alternative embodiment as shown in FIG. 3C, sensor detections 114 being located at the initial contour 140 are provided with a neutral weight of e.g. 1.0, whereas the sensor detections 114 being located on an inner side of the initial contour 140 with respect to the vehicle 100 or the radar sensor 110 (see FIG. 1) are provided with an increased weight 370 being e.g. greater than 1.0, and the sensor detections 114 being located on an outer side averted from the vehicle 100 and the radar sensor 110 are provided with a decreased weight 380 with respect to the neutral weight, i.e. with a weight being e.g. smaller than 1.0. The absolute values of the respective increased weights 370 and decreased weights 380 are illustrated by the respective lengths of the arrows 370, 380 which symbolize the weights.

The amount for increasing or decreasing the weight with respect to the normal weight of e.g. 1.0 depends on the distance of the respective sensor detection 114 from the initial contour 140. However, an upper limit for such a distance may be defined in order to exclude outliers from the procedure of determining the contour of the object.

FIG. 4 illustrates the steps for the refinement of the initial contour 140 based on the weighted sensor detections 350, 360 which are associated with a respective segment 160 of the initial contour 140. FIG. 4A depicts an enlarged portion of the initial contour 140 which includes one of the segments 160, and the weighted sensor detections 350, 360 which are associated with this segment 160. The associated sensor detections 350, 360 represent a surrounding set of sensor detections 114 which is associated with the respective segment 160. The surrounding set of sensor detections 114 therefore includes the sensor detections 350 associated regularly in the first association step and being provided with a normal weight of e.g. 1.0, and a sensor detection 360 being associated to the segment 160 in the second or special association step and provided with an increased weight being greater than 1.0 (see also FIG. 3B).

The segment 160 of the initial contour 140 is refined by a fitting or regression procedure for the segment which uses the weighted sensor detections 350, 360 of the surrounding set associated with the respective segment 160. For the regression, a Deming regression or a Kalman filter may be used. Generally, the regression procedure tries to minimize the sum of distances 410 between the sensor detections 114, 350, 360 and the segment 160.

In FIG. 4B, a regression of the segment 160 is depicted which would rely on equal weights for all sensor detections 114. Due to the equal weighting, the deviation or distance 410 of each of the sensor detections 114 would be maintained within the regression procedure, as can be recognized by a comparison of FIG. 4A and FIG. 4B. However, the method according to the disclosure uses different weights for the sensor detections 114 due to the two different associations steps, i.e. the regular association as shown in FIG. 3A and the special association as shown in FIG. 3B, or due to the different weighting as depicted in FIG. 3C.

Due to the different weights of the sensor detections 350 and 360, i.e. due to the increased weight of the sensor detection 360 according to the special association described above, the segment 160 is refined during the regression procedure by "attracting" the segment 160 in the direction of the sensor detection 360 having the increased weight. This is shown in FIG. 4C. The refinement of the segment 160 of FIG. 4A can be recognized from by a comparison with a refined segment 420 as shown in FIG. 4C.

Due to the refinement of the segments 160, the spread of the sensor detections 114 with respect to the initial contour 140 is incorporated in the method for determining the contour. Due to the association and weighting procedure as described in context of FIG. 3, sensor detections 114 being closer to the sensor 110 and the vehicle 100 are provided with an increased weight which causes that the refinement of the initial contour 140 shifts this contour in a direction to the vehicle 100 or sensor 110.

The effect of the refinement on the initial contour 140 is stronger for such portions of the initial contour 140 in which a great spread of the sensor detections 114 is present with respect to the initial contour 140 than in such portions of the initial contour 140 in which a small or almost no spread with respect to the initial contour 140 is present. This is illustrated by the scenarios denoted by B and C in FIG. 5. For both scenarios, the sensor detections 114 in a middle region of the contour show a great spread in two directions or dimensions, i.e. also in a direction perpendicular to the initial contour 140. Therefore, the sensor detections 114 being located closer to the vehicle 100 and to the sensor 110 are provided with an increased weight, i.e. with respect to the further sensor detections 114 which have a greater distance with respect to the vehicle 100 and the sensor 110 and which are provided with a decreased weight.

As a result, the initial contour 140 is refined for both scenarios denoted by B and C in FIG. 5 in such a manner that a respective final contour 520, 530 is strongly shifted in the direction to the vehicle 100 in comparison to the initial contour 140 in such portions in which a great spread of the sensor detections 114 is present. Therefore, the final contours 520, 530 represent the real contour of the respective object more accurately than the initial contour 140. This can be recognized by a comparison to the scenario denoted by A for which no association steps, no weighting steps and no refinement steps as described above in context of FIGS. 3 and 4 are applied to the initial contour 140.

FIG. 6 shows a flow diagram 600 illustrating a method for determining a contour of an object with respect to a sensor. The sensor may be configured to provide a plurality of sensor detections, and each sensor detection may include a respective position at the object.

At 602, an initial contour of the object may be determined including a plurality of segments, each segment being related to a respective initial subset of the sensor detections. At 604, a respective surrounding set of the sensor detections may be associated with each segment of the initial contour. At 606, a respective weight may be provided to each of the sensor detections of the respective surrounding set, each weight depending from a relative position of the sensor detection with respect to the associated segment. At 608, each segment of the initial contour may be refined by using the weights of the sensor detections of the respective surrounding set associated with the respective segment in order to determine a final contour including the refined segments for the object.

According to various embodiments, the initial contour may further include a plurality of vertices, and the segments of the initial contour may extend between a respective pair of the vertices. One of the sensor detections may be selected as a first vertex, and the further vertices following the first vertex may be iteratively determined by: selecting the respective initial subset of the sensor detections with respect to the respective preceding vertex, and estimating a position of the next vertex by utilizing the respective initial subset being selected with respect to the preceding vertex.

According to various embodiments, selecting the respective initial subset of the sensor detections for the preceding vertex may include selecting sensor detections being located within a predefined area around the preceding vertex.

According to various embodiments, the predefined area may be provided as a rectangular bounding box which may be centered at the respective vertex and which may be shifted from a respective one of the vertices to the subsequent vertex when the plurality of vertices is determined iteratively.

According to various embodiments, the sensor detections selected for the initial subset for the preceding vertex may be excluded from the initial subset for the subsequent vertex.

According to various embodiments, the sensor detection selected as the first vertex may be identified by: determining at least two sorted lists for the positions of the sensor detections, each sorted list referring to a respective coordinate of the positions, selecting the sorted list having the greatest difference between a first element and a last element of the list, and selecting the first element of the selected sorted list as the first vertex.

According to various embodiments, estimating the position of the next vertex by utilizing the respective initial subset may include determining a segment vector extending from the preceding vertex to the next vertex by: calculating a geometric mean over the sensor detections of the respective initial subset, wherein the geometric mean may provide a direction of the segment vector, and determining a most distant sensor detection with respect to the preceding vertex within the respective initial subset, wherein a distance between the most distant sensor detection and the preceding vertex may define the absolute value of the segment vector.

According to various embodiments, a respective primary area may be arranged symmetrically to the respective segment, and the respective surrounding set of sensor detections may include regular sensor detections which are located within the primary area. A respective modified area may be determined by modifying the respective primary area according to a distribution of the sensor detections with respect to the sensor, and the respective surrounding set of sensor detections may further include special sensor detections which are located within the modified area and outside of the primary area. The regular sensor detections may be provided with a normal weight, and the special sensor detections may be provided with an increased weight being larger than the normal weight.

According to various embodiments, the respective modified area may be determined by shifting the respective primary area in a direction perpendicular to the respective segment, and the direction and the amount of the shifting may depend on the distribution of the sensor detections with respect to the sensor.

According to various embodiments, a respective segment vector may be determined as a difference between position vectors of the pair of vertices being associated with the respective segment, a respective normal vector being perpendicular to the respective segment vector may be determined for each segment, and an auxiliary vector may be determined as a difference of a position vector of a reference close to the sensor position and a position vector of a center of the segment being closest to the sensor. For all segments, an amount of the shift of the primary area may be given by a dot product of the auxiliary vector and the normal vector of the segment being closest to the sensor and a direction of the shift is given by the respective normal vector of the segment.

According to various embodiments, it may be determined for each sensor detection of the respective surrounding set whether the sensor detection is located at the initial contour, on an inner side of the initial contour facing the sensor or on an outer side of the initial contour being averted from the sensor. The sensor detections located at the initial contour may be provided with a normal weight, whereas the sensor detections located on the inner side may be provided with an increased weight which is greater than the normal weight, and the sensor detections located on the outer side may be provided with a decreased weight which is smaller than the normal weight.

According to various embodiments, refining each segment of the initial contour may include using a regression procedure for adapting the respective segment to the weighted sensor detections of the respective surrounding subset of sensor detections associated with the respective segment.

Each of the steps 602, 604, 606, 608 and the further steps described above may be performed by computer hardware components.

Figure 7:
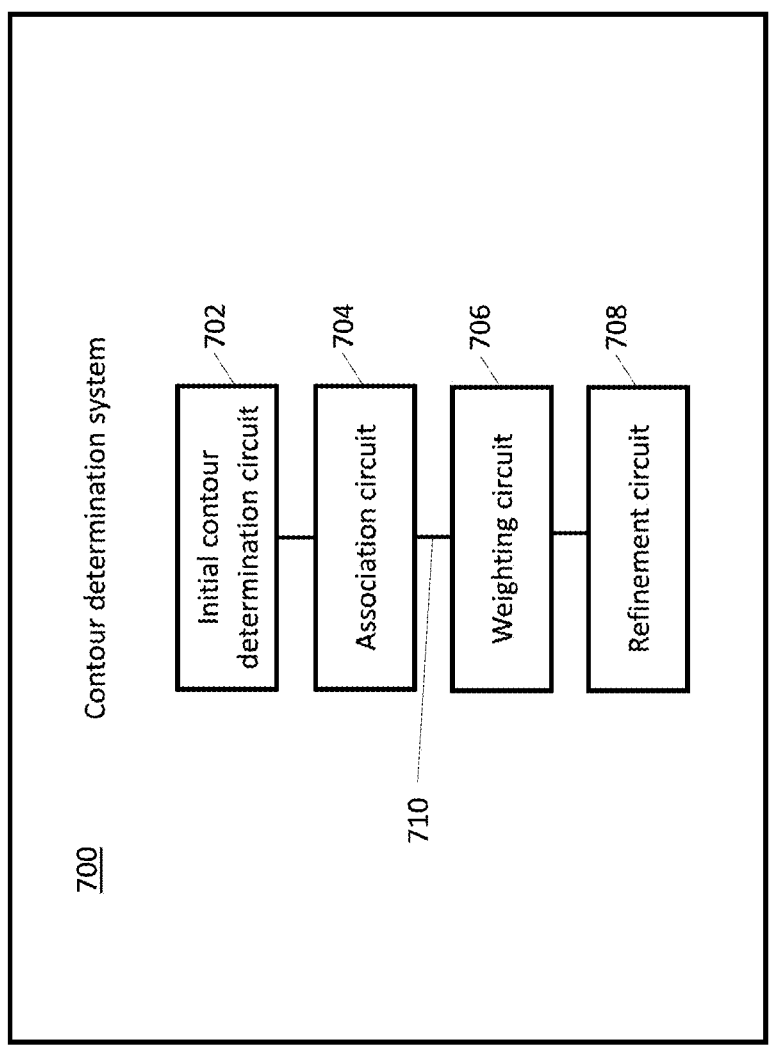
FIG. 7 is an illustration of an illustration of a contour determination system according to various embodiments.

FIG. 7 shows a contour determination system 700 according to various embodiments. The contour determination system 700 may include an initial contour determination circuit 702, an association circuit 704, a weighing circuit 706, and a refinement circuit 708.

The initial contour determination circuit 702 may be configured to determine an initial contour of the object including a plurality of segments, each segment being related to a respective initial subset of the sensor detections.

The association circuit 704 may be configured to associate a respective surrounding set of the sensor detections with each segment of the initial contour.

The weighing circuit 706 may be configured to provide a respective weight to each of the sensor detections of the respective surrounding set, each weight depending from a relative position of the sensor detection with respect to the associated segment.

The refinement circuit 708 may be configured to refine each segment of the initial contour by using the weights of the sensor detections of the respective surrounding set associated with the respective segment in order to determine a final contour including the refined segments for the object.

The initial contour determination circuit 702, the association circuit 704, the weighing circuit 706, and the refinement circuit 708 may be coupled to each other, e.g. via an electrical connection 710, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 8:
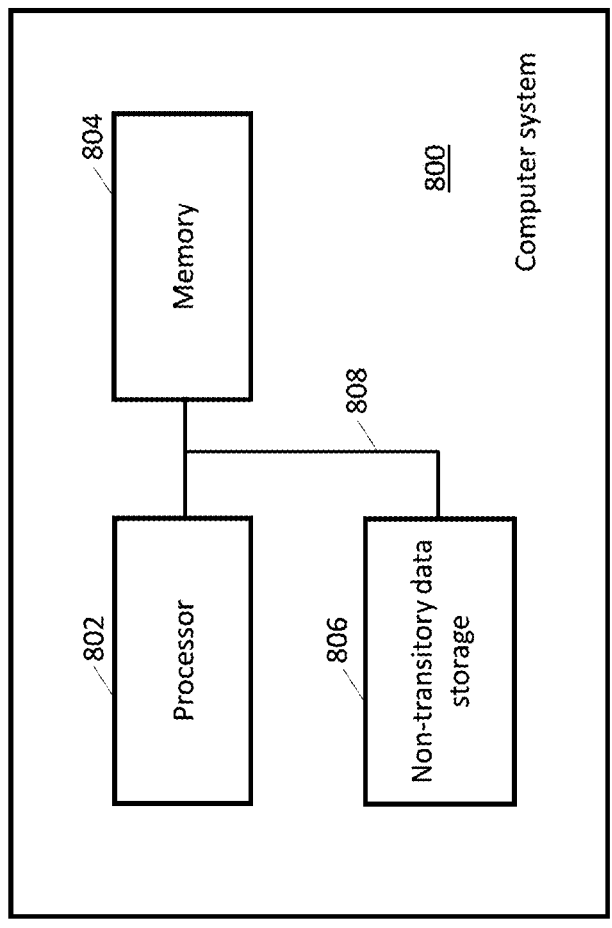
FIG. 8 is an illustration of a computer system with a plurality of computer hardware components configured to carry out steps of a computer implemented method as described herein.

FIG. 8 shows a computer system 800 with a plurality of computer hardware components configured to carry out steps of a computer implemented method for predicting respective trajectories of a plurality of road users according to various embodiments. The computer system 800 may include a processor 802, a memory 804, and a non-transitory data storage 806.

The processor 802 may carry out instructions provided in the memory 804. The non-transitory data storage 806 may store a computer program, including the instructions that may be transferred to the memory 804 and then executed by the processor 802.

The processor 802, the memory 804, and the non-transitory data storage 806 may be coupled with each other, e.g. via an electrical connection 808, such as e.g. a cable or a computer bus or via any other suitable electrical connection to exchange electrical signals.

As such, the processor 802, the memory 804 and the non-transitory data storage 806 may represent the initial contour determination circuit 702, the association circuit 704, the weighing circuit 706, and the refinement circuit 708, as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the contour determination system 700 and/or for the computer system 800.

REFERENCE NUMERAL LIST

100 vehicle
110 radar sensor
112 instrumental filter view
114 sensor detections
120 object
122 real contour of the object
130 approximated contour according to the related art
140 polyline, initial contour
150 vertex
151 first vertex
152 second vertex
153 third vertex
154 to 156 further vertices
160 segment
161 first segment
165 closest segment with respect to vehicle
200 iterative procedure for determining the initial contour
201 to 205 first to fifth iteration

210 selected sorting direction
221 first square bounding box
222 second square bounding box
223 to 225 further square bounding boxes
232 mean point
234 most distant sensor detection
236 first segment vector
238 second segment vector
310 rectangular association bounding box
320 shifted association bounding box
330 shift direction
340 auxiliary vector
350 regularly associated sensor detections having a normal weight
360 sensor detection having a special association and an increased weight
370 increased weight provided to a sensor detection
380 decreased weight provided to a sensor detection
410 distance from a detection to the segment
420 refined segment
520, 530 final contour
600 flow diagram illustrating a method for determining a contour of an object with respect to a sensor
602 step of determining an initial contour of the object including a plurality of segments, each segment being related to a respective initial subset of the sensor detections
604 step of associating a respective surrounding set of the sensor detections with each segment of the initial contour
606 step of providing a respective weight to each of the sensor detections of the respective surrounding set, each weight depending from a relative position of the sensor detection with respect to the associated segment of the detection
608 step of refining each segment of the initial contour by using the weights of the detections of the respective surrounding set associated with the respective segment in order to determine a final contour including the refined segments for the object
700 contour determination system
702 initial contour determination circuit
704 association circuit
706 weighing circuit
708 refinement circuit
710 connection
800 computer system according to various embodiments
802 processor
804 memory
806 non-transitory data storage
808 connection

What is claimed is:

1. A computer implemented method for determining a contour of an object with respect to a sensor, the sensor being configured to provide a plurality of sensor detections, each sensor detection including a respective position at the object, the method comprising:

determining an initial contour of the object including a plurality of segments, each segment being related to a respective initial subset of the sensor detections, associating a respective surrounding set of the sensor detections with each segment of the initial contour, providing a respective weight to each of the sensor detections of the respective surrounding set, each weight depending from a relative position of the sensor detection with respect to the associated segment, and refining each segment of the initial contour by using the weights of the sensor detections of the respective surrounding set associated with the respective segment in order to determine a final contour including the refined segments for the object, wherein:

for each sensor detection of the respective surrounding set, it is determined whether the sensor detection is located at the initial contour, on an inner side of the initial contour facing the sensor or on an outer side of the initial contour being averted from the sensor, the sensor detections located at the initial contour are provided with a normal weight, the sensor detections located on the inner side are provided with an increased weight which is greater than the normal weight, and the sensor detections located on the outer side are provided with a decreased weight which is smaller than the normal weight.

2. The method according to claim 1, wherein:

the initial contour further includes a plurality of vertices, the segments of the initial contour extend between a respective pair of the vertices, one of the sensor detections is selected as a first vertex, the further vertices following the first vertex are iteratively determined by:

selecting the respective initial subset of the sensor detections with respect to the respective preceding vertex, and estimating a position of the next vertex by utilizing the respective initial subset being selected with respect to the preceding vertex.

3. The method according to claim 2, wherein:

selecting the respective initial subset of the sensor detections for the preceding vertex includes selecting sensor detections being located within a predefined area around the preceding vertex.

4. The method according to claim 3, wherein:

the predefined area is provided as a rectangular bounding box which is centered at the respective vertex and which is shifted from a respective one of the vertices to the subsequent vertex when the plurality of vertices is determined iteratively.

5. The method according to claim 2, wherein:

the sensor detections selected for the initial subset for the preceding vertex are excluded from the initial subset for the subsequent vertex.

6. The method according to claim 2, wherein:

the sensor detection selected as the first vertex is identified by:

determining at least two sorted lists for the positions of the sensor detections, each sorted list referring to a respective coordinate of the positions, selecting the sorted list having the greatest difference between a first element and a last element of the list, and selecting the first element of the selected sorted list as the first vertex.

7. The method according to claim 2, wherein:

estimating the position of the next vertex by utilizing the respective initial subset includes determining a segment vector extending from the preceding vertex to the next vertex by:

calculating a geometric mean over the sensor detections of the respective initial subset, wherein the geometric mean provides a direction of the segment vector, and determining a most distant sensor detection with respect to the preceding vertex within the respective initial subset, wherein a distance between the most distant sensor detection and the preceding vertex defines the absolute value of the segment vector.

8. The method according to claim 2 wherein:

a respective primary area is arranged symmetrically to the respective segment, the respective surrounding set of sensor detections includes regular sensor detections which are located within the primary area, a respective modified area is determined by modifying the respective primary area according to a distribution of the sensor detections with respect to the sensor, the respective surrounding set of sensor detections further includes special sensor detections which are located within the modified area and outside of the primary area, the regular sensor detections are provided with a normal weight, and the special sensor detections are provided with an increased weight being larger than the normal weight.

9. The method according to claim 1, wherein:

refining each segment of the initial contour includes using a regression procedure for adapting the respective segment to the weighted sensor detections of the respective surrounding subset of sensor detections associated with the respective segment.

10. A non-transitory computer readable medium comprising instructions for carrying out the computer implemented method of claim 1.

11. A computer system comprising of one or more processors configured to:

receive a plurality of sensor detections from a sensor configured to determine a respective position of the sensor detections;

determine a contour of an object with respect to the sensor;

determine an initial contour of the object including a plurality of segments, each segment being related to a respective initial subset of the sensor detections;

associate a respective surrounding set of the sensor detections with each segment of the initial contour;

provide a respective weight to each of the sensor detections of the respective surrounding set, each weight depending from a relative position of the sensor detection with respect to the associated segment; and refine each segment of the initial contour by using the weights of the sensor detections of the respective surrounding set associated with the respective segment in order to determine a final contour including the refined segments for the object, wherein:

for each sensor detection of the respective surrounding set, it is determined whether the sensor detection is located at the initial contour, on an inner side of the initial contour facing the sensor or on an outer side of the initial contour being averted from the sensor, the sensor detections located at the initial contour are provided with a normal weight, the sensor detections located on the inner side are provided with an increased weight which is greater than the normal weight, and the sensor detections located on the outer side are provided with a decreased weight which is smaller than the normal weight.

12. The computer system according to claim 11, wherein:

the initial contour further includes a plurality of vertices;

the segments of the initial contour extend between a respective pair of the vertices;

one of the sensor detections is selected as a first vertex;

the further vertices following the first vertex are iteratively determined by:

selecting the respective initial subset of the sensor detections with respect to the respective preceding vertex and estimating a position of the next vertex by utilizing the respective initial subset being selected with respect to the preceding vertex.

13. The computer system according to claim 12, wherein selecting the respective initial subset of the sensor detections for the preceding vertex includes selecting sensor detections being located within a predefined area around the preceding vertex.

14. The computer system according to claim 13, wherein the predefined area is provided as a rectangular bounding box which is centered at the respective vertex and which is shifted from a respective one of the vertices to the subsequent vertex when the plurality of vertices is determined iteratively.

15. The computer system according to claim 12, wherein the sensor detections selected for the initial subset for the preceding vertex are excluded from the initial subset for the subsequent vertex.

16. The computer system according to claim 12, wherein the sensor detection selected as the first vertex is identified by:

determining at least two sorted lists for the positions of the sensor detections, each sorted list referring to a respective coordinate of the positions;

selecting the sorted list having the greatest difference between a first element and a last element of the list; and selecting the first element of the selected sorted list as the first vertex.

17. A vehicle comprising the computer system recited by claim 11.

* * * * *